B. G. LAMME.
FIELD MAGNET WINDING FOR DYNAMO ELECTRIC MACHINES.
APPLICATION FILED JAN. 26, 1910.
1,095,331.
Patented May 5, 1914.
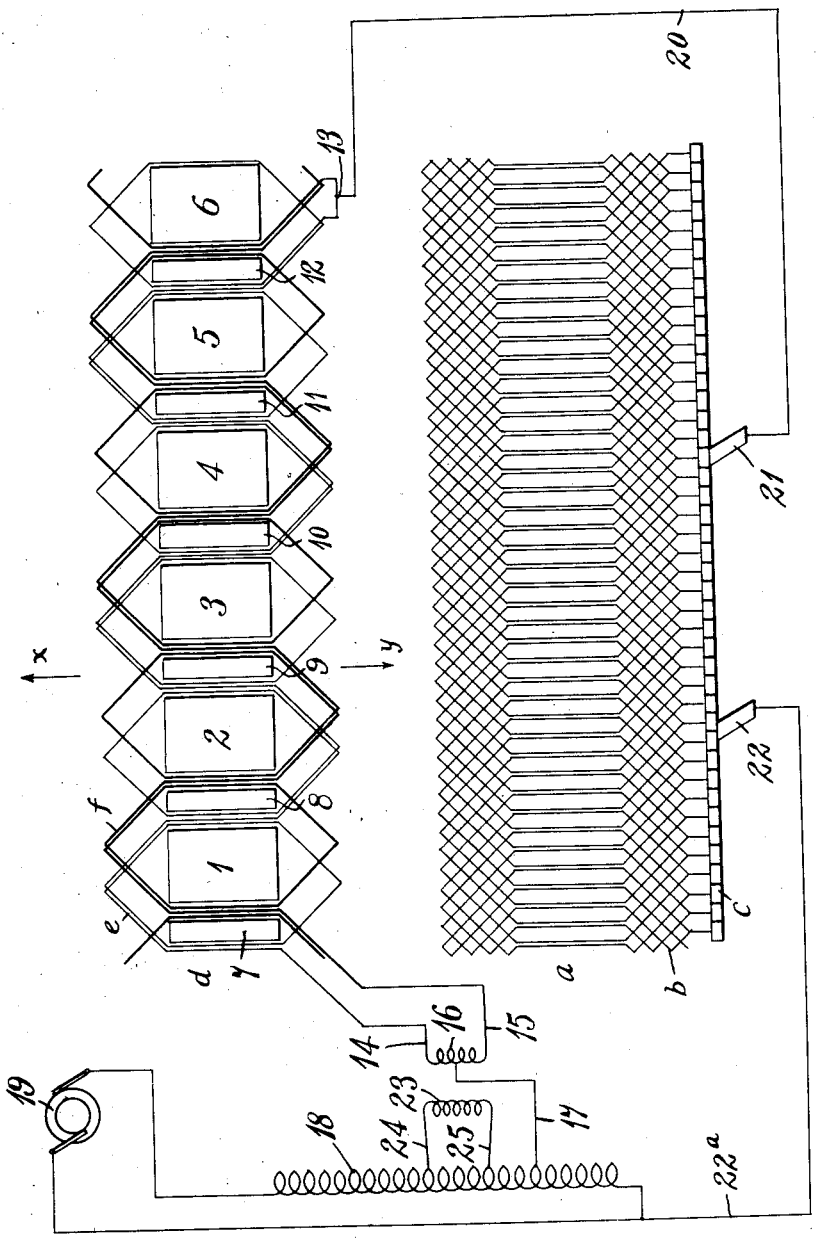
WITNESSES:
Fred H. Miller
R. J. Earbour
INVENTOR
Benjamin G. Lamme
BY
Wesley G. Sloan
ATTORNEY

UNITED STATES PATENT OFFICE.

BENJAMIN G. LAMME, OF PITTSBURGH, PENNSYLVANIA, ASSIGNOR TO WESTINGHOUSE ELECTRIC AND MANUFACTURING COMPANY, A CORPORATION OF PENNSYLVANIA.

FIELD-MAGNET WINDING FOR DYNAMO-ELECTRIC MACHINES.

1,095,331. Specification of Letters Patent. Patented May 5, 1914.

Application filed January 26, 1910. Serial No. 540,187.

*To all whom it may concern:*

Be it known that I, BENJAMIN G. LAMME, a citizen of the United States, and a resident of Pittsburgh, in the county of Allegheny and State of Pennsylvania, have invented a new and useful Improvement in Field-Magnet Windings for Dynamo-Electric Machines, of which the following is a specification.

My invention relates to dynamo-electric machines, and it has special reference to single phase motors of the commutator type.

The object of my invention is to provide a simple and symmetrical field magnet winding which shall be so arranged, and traversed by such currents as to produce, not only the usual field magnet poles, but also intermediate or commutating poles, whereby the necessity for an independent compensating winding is obviated.

Small single phase motors of the commutator type have usually been provided with compensating windings on the field magnet or primary member in order to prevent cross magnetization and to neutralize the armature self induction. A winding of this character is, however, relatively expensive, particularly for machines of small capacity and, consequently, it is my present aim to prevent the cross magnetization and to provide a motor having reasonably good characteristics without using any compensating winding.

The pole face in a single phase motor covers a certain section of the armature winding and the ampere turns under this pole face produce a cross magnetization or cross flux through the pole face, the flux entering at one edge of the pole and leaving at the other. Since this cross flux is alternating, it produces self induction in the armature winding and, consequently, has an injurious effect upon the power factor and efficiency of the machine. The cross flux in question will depend upon the number of armature ampere turns covered by the pole face and, consequently, if the number of poles is doubled without changing the number of armature turns, the cross flux per pole will be approximately halved and the self induction will be greatly reduced. It is not generally feasible, however, to increase the number of poles in order to cut down the amount of cross flux when the usual parallel armature winding is employed because increasing the number of poles decreases the number of conductors in series in the armature winding and also decreases the induction per pole. This is evident, since decreasing the induction per pole and the number of conductors in series greatly reduces the generated armature voltage or the counter-electromotive force, so that, for a given torque, the current handled at the commutator will be very much increased. On the other hand, if the number of poles is increased when the well-known two-circuit or series type of armature winding is employed, the flux per pole is proportionately diminished, but, in this case, the generated armature voltage or the counter-electromotive force remains the same, since this voltage is dependent upon the armature speed, in revolutions, the flux per pole, the number of poles and the number of conductors in series, and, therefore, for a given armature speed, if the number of poles is increased and the induction per pole is proportionately decreased, the generated voltage remains the same. However, by increasing the number of poles, the number of armature turns under each pole is diminished and, consequently, the armature flux is proportionately diminished. The cross flux, in turn, acts upon a smaller number of armature conductors so that the self induction per pole is very materially reduced and the total armature self-induction, due to cross magnetization, is considerably diminished. From the foregoing, it is evident that by using a two-circuit or series type of armature winding and sufficiently increasing the number of poles, the armature self induction, due to cross magnetization, may be so reduced as to render a neutralizing or compensating winding unnecessary. This arrangement has the disadvantage of increasing the so called "voltage of reversal" in the armature coils under the commutator brushes, since, with a series type of winding, the number of conductors in series between any two adjacent commutator bars is equal to the number of poles. The commutating characteristics would usually be very poor if the number of poles were increased sufficiently to materially reduce the armature self induction. Experience has shown that it is possible to materially reduce the "voltage of reversal" by the use of commutating poles for the purpose of overcoming the local magnetic field produced by the armature coils, which are being reversed.

According to my present invention, I provide a simple field magnet winding and excite it in such manner as to produce the usual main magnetic poles and intermediate or commutating poles which are out-of-phase with the main poles. By utilizing this field winding with a two-circuit or series type of armature winding, I provide a satisfactory motor of the commutator type for operation by single phase currents, which is much simpler and less expensive than the motors of this type which have heretofore been constructed.

The single figure of the accompanying drawing is a diagrammatic view showing developments of single phase motor windings embodying my invention, and the external circuit connections therefor.

Referring to the drawing, an armature winding $a$ of a two-circuit or series type, having its coils $b$ connected to the commutator bars $c$ in the usual manner, is associated with a field magnet winding $d$ comprising two parts $e$ and $f$ which are, for convenience in illustration, shown by light and heavy lines, respectively. The two parts $e$ and $f$ are similar to each other, but are spaced apart slightly so that the corresponding coils of both parts surround each of the main poles 1, 2, 3, 4, 5 and 6, and so that auxiliary or commutating poles 7, 8, 9, 10, 11 and 12 are produced between corresponding conductors of the two parts and are surrounded by non-corresponding coils of the two parts. Two corresponding terminals of the two parts are joined together at 13 and the other corresponding terminals of the parts are respectively connected to the terminals 14 and 15 of a transformer winding 16. An intermediate point—preferably the middle point—in the transformer winding 16 is connected to a source of alternating current energy, such as tap 17 in a transformer 18, which is connected across the circuit of the single phase generator 19. The point 13 is connected, by conductor 20, to a commutator brush 21, and a commutator brush 22 is connected, by means of a conductor 22ª, to the side of the supply circuit which is opposite that of the connection 17. Energy is consequently supplied to the motor in series and traverses the two parts of the main field magnet winding in parallel.

A primary winding 23 is supplied with energy from intermediate taps 24 and 25 of the transformer 18 and is in inductive relation to the winding 16, so that a current is induced therein and traverses the two parts of the field magnet winding in series. Since the energy supplied to this circuit is largely inductive the magnetizing current will lag approximately 90° behind the transformer electro-motive force. The current is therefore out-of-phase with the main field exciting current and it traverses the two parts of the winding in such manner that magnetic poles are produced at 7, 8, 9, 10, 11 and 12, which are out-of-phase with the main magnetic poles.

In order to make the truth of the above statement apparent, the main poles 1 and 2 and the intermediate pole 8 may be considered: Assuming that, at a given instant, the current is flowing from conductor 17 oppositely through two halves of the transformer winding 16; through conductors 14 and 15, and through the parts $e$ and $f$ of the main winding, to the point 13; the currents will flow through the conductors between the poles 1 and 8, and 8 and 2 in the direction of the arrow $y$, and the currents will flow in the conductors between the poles 2 and 9, and 9 and 3 in the direction of the arrow $x$. It is, therefore, apparent that both parts of the main field winding are active in producing the main magnetic poles. By reason of the transformer action between the windings 23 and 16, a current may be assumed to be flowing at the same instant from terminal 14 of the winding 16 through the part $e$ of the main winding to the terminal 13 and in the opposite direction from this point through the part $f$ to the terminal 15 of the transformer. This out-of-phase current traverses the conductors between the poles 1 and 8 in the direction of the arrow $y$ and traverses the conductors between the poles 2 and 9 in the direction of the arrow $x$, but the out-of-phase current traverses the conductors between the poles 8 and 2, in the direction of the arrow $x$, and traverses the conductors between the poles 9 and 3, in the direction of the arrow $y$. Therefore, the out-of-phase current produces an out-of-phase magnetic pole at 8 which serves as a commutating pole in the operation of the machine.

Considerable saving in expense is effected by avoiding the necessity of an independent winding for producing commutating poles or for neutralizing the armature self induction and it is evident that my invention may be applied to various types of dynamo-electric machines.

I claim as my invention:

1. The combination with a dynamo-electric machine having a multipolar series or two circuit armature winding to reduce the armature self-induction due to cross magnetization and a multipolar field magnet having a winding composed of two similar spaced parts, of means for supplying current to the two parts in parallel for producing main magnetic poles and means for supplying out-of-phase current to the two parts in series for producing auxiliary or commutating magnetic poles to reduce the voltage of reversal.

2. The combination with a multipolar series or two circuit armature winding, a commutator connected to the armature coils, and brushes engaging the commutator bars, of a multipolar field magnet having a winding composed of two parts that are spaced apart and are joined at one end to one of the commutator brushes and a transformer winding by which the parts of the field magnet winding are joined at their opposite ends, of a source of alternating current energy connected to the middle point of the transformer and to the commutator brush of opposite polarity, and means for inducing out-of-phase current in the transformer winding which traverses the two parts of the field magnet winding in series.

In testimony whereof, I have hereunto subscribed my name this 19th day of Jan., 1910.

BENJ. G. LAMME.

Witnesses:
 E. LIVINGSTONE,
 B. B. HINES.